(12) United States Patent
Väänänen

(10) Patent No.: US 7,933,738 B2
(45) Date of Patent: Apr. 26, 2011

(54) DETERMINING A POINT OF APPLICATION OF FORCE ON A SURFACE ELEMENT

(75) Inventor: Johannes Väänänen, Oulu (FI)

(73) Assignee: Qitec Technology Group Oy, Tuusula (FI)

( * ) Notice: Subject to any disclaimer, the term of this patent is extended or adjusted under 35 U.S.C. 154(b) by 883 days.

(21) Appl. No.: 11/710,156

(22) Filed: Feb. 23, 2007

(65) Prior Publication Data

US 2009/0012725 A1    Jan. 8, 2009

(30) Foreign Application Priority Data

Feb. 24, 2006 (EP) .................................. 06003783

(51) Int. Cl.
*G06F 19/00* (2006.01)
(52) U.S. Cl. .......... 702/139; 702/41; 702/190; 345/156; 345/173; 178/18.02
(58) Field of Classification Search ................... 702/139, 702/41, 98, 95, 190; 345/173, 156; 178/18.02
See application file for complete search history.

(56) References Cited

U.S. PATENT DOCUMENTS

| 5,241,308 A | 8/1993 | Young |
| 6,285,358 B1 | 9/2001 | Roberts |
| 7,148,882 B2 * | 12/2006 | Kamrath et al. ............. 345/174 |

* cited by examiner

*Primary Examiner* — Drew A Dunn
*Assistant Examiner* — Hien X Vo
(74) *Attorney, Agent, or Firm* — Merchant & Gould P.C.

(57) ABSTRACT

A system for determining at least one point of application of force on a surface element is provided. The system includes a surface element having an effective mass, at least one sensor configured to measure force applied on the surface element at least one acceleration sensor configured to measure acceleration in at least one direction, and a processing unit configured to receive, from the at least one sensor, signals indicating force applied on the surface element, to receive, from the at least one acceleration sensor, signals indicating acceleration, to filter out a disturbing force, determined based on acceleration signals and the effective mass of the surface element, from the signals indicating the force applied on the surface element, and to determine, based on the filtered signals, at least one point of application of force on the surface element.

7 Claims, 2 Drawing Sheets

DETERMINING A POINT OF APPLICATION OF FORCE ON A SURFACE ELEMENT

FIELD OF THE INVENTION

The present invention relates to solutions with a touch-sensitive operation interface. In particular, the present invention relates to a novel and improved method, system, computer program, physical object and processing device for determining a point of application of force on a surface.

BACKGROUND OF THE INVENTION

Various kinds of devices comprise a user interface that is touch-sensitive. Touch sensitive panels and screens allow a user to interact with the device by touching e.g. pictures, words, symbols or buttons on a touch sensitive surface. Touch sensitive technology can be used as an alternative user interface with applications that normally use electromechanical keyboards or buttons. Some computer applications are designed specifically for touch sensitive technology, often having larger icons and links than a typical, e.g. PC application. The following lists typical types of touch screen technology:

Resistive: A resistive touch screen panel is coated with a thin metallic electrically conductive and resistive layer that causes a change in the electrical current which is registered as a touch event and sent to the controller for processing.

Surface wave: Surface wave technology uses ultrasonic waves that pass over the touch screen panel. When the panel is touched, a portion of the wave is absorbed. This change in the ultrasonic waves registers the position of the touch event and sends this information to the controller for processing.

Capacitive: A capacitive touch screen panel is coated with a material that stores electrical charges. When the panel is touched, a small amount of charge is drawn to the point of contact. Circuits located at each corner of the panel measure the charge and send the information to the controller for processing. Capacitive touch screen panels must be touched with a finger unlike resistive and surface wave panels that can use fingers and stylus.

For example, Personal Digital Assistants (PDA) typically comprise a large display area in proportion to the size of the device. Most PDAs include only a few mechanical buttons in order to provide as large display area as possible. Therefore, the display area is also used as an input device. The display area is usually touch-sensitive so that information can be transferred into the device just by touching the display or using a special tool, e.g. a special pen (i.e. stylus).

A touch screen may also be a touch-sensitive panel. U.S. Pat. No. 5,241,308 (Paragon Systems) describes a touch-sensitive panel for generating selected ones of any of a plurality of different signals, each of which is generated by touching a different location on the panel. The apparatus includes also force-sensing means for sensing the magnitudes of the forces that are applied to each panel member support by the panel member when the member is touched at a selected location.

Let's assume that a hand-held device has a display that is covered by a lens (touch sensitive panel). One or more force sensors are attached to the lens in order to determine the point of application on the lens. Each of the force sensors produces a signal in response to a touch on the lens. The signals are received and processed with a processing unit. When the device is kept e.g. in hand and the hand moves, the movement itself produces signals that are not a result of a touch on the lens. If the lens is touched at the same time as the hand moves, the signals comprise two separate signal components: a signal component produced by the touch and a signal component produced by the hand movement. In practice, the signal component produced by the movement is an interference signal that distorts the actual touch signal component. Due to the distortion, the actual point of touch may be determined erroneously.

The same problem applies also to e.g. a situation in which a device having a touch panel (or equivalent) is arranged to be used in a vehicle. Vibrations of the vehicle and variations in acceleration of the vehicle induce interference signal components to the signals of the force sensors.

Based on the above there is an obvious need for a solution that would mitigate and/or alleviate the above drawbacks.

SUMMARY OF THE INVENTION

According to one aspect of the invention, there is provided a system for determining at least one point of application of force on a surface element having an effective mass, at least one sensor configured to measure force applied on the surface element, at least one acceleration sensor configured to measure acceleration in at least one direction, and a processing unit configured to receive, from the at least one sensor, signals indicating force applied on the surface element, to receive, from the at least one acceleration sensor, signals indicating acceleration, to filter out a disturbing force, determined based on acceleration signals and the effective mass of the surface element, from the signals indicating the force applied on the surface element, and to determine, based on the filtered signals, at least one point of application of force on the surface element. If the system is arranged into a single device, e.g. a hand-held device, the mass of the surface element (e.g. a lens covering a display in the hand-held device) may induce a force to the force sensors when the device moves due to external forces (e.g. trembling, hand movement when the device is a hand-held device etc.). Without any filtering the values provided by the force sensors may be distorted. If the place of application of force were determined based on unfiltered force values, the calculated place of application of force would be incorrect in many cases.

Therefore, the disturbing force induced by the surface element may be subtracted from the force(s) determined based on signals from the at least one sensor. If the result of the subtraction is less than a predetermined value (e.g. essentially zero), the signals from the at least one sensor were not a result of an actual application of force on the surface element. If the result of the subtraction is greater than the predetermined value, the at least one point of application of force on the surface element is determined based on the corrected force values. All the calculations and determinations are performed with the processing unit in one embodiment of the invention.

As disclosed above, the system itself may be a hand-held device, e.g. a Personal Digital Assistant (PDA) or a mobile phone or any other comprises all the mentioned elements. In another embodiment of the invention, the system is a distributed system. In other words, the sensors itself are arranged into a first location and the processing unit is arranged into a second location. The sensors are then connected to the processing unit e.g. by wire or wireless communication. Furthermore, the surface element may comprise solid material, liquid material or solid and liquid material.

According to a second aspect of the invention, there is provided a method for determining at least one point of application of force on a surface element. The method comprises receiving, from at least one sensor, signals indicating force applied on the surface element. The method further comprises receiving, from at least one acceleration sensor, signals indicating acceleration in at least one direction. A disturbing force, determined based on acceleration signals and an effective mass of the surface element, is filtered out from the signals indicating the force applied on the surface element and at least one point of application of force on the surface element is determined based on the filtered signals.

In one embodiment, the method further comprises subtracting the disturbing force from the force determined based on signals from the at least one sensor. If the result of the subtraction is less than a predetermined value, it is determined that the signals from the at least one sensor were not a result of application of force on the surface element. Alternatively, the at least one point of application of force on the surface element is determined based on the corrected signal values of the at least one sensor, when the result of the subtraction is greater than the pre-determined value.

According to a third aspect of the invention, there is provided a computer program for determining at least one point of application of force on a surface element, wherein the computer program comprises code adapted to perform the method steps of the invention. In one embodiment, the computer program is embodied on a computer-readable medium.

According to a fourth aspect of the invention, there is provided a physical object having a touch-sensitive operation interface. The physical object comprises at least one sensor configured to measure force applied on a surface element, at least one acceleration sensor configured to measure acceleration of the physical object or the surface element in at least one direction and an output interface configured to transmit signals from the at least one sensor and the at least one acceleration sensor to an external processing unit.

According to a fifth aspect of the invention, there is provided a physical object having a touch-sensitive operation interface. The physical object comprises at least one sensor configured to measure force applied on a surface element, at least one acceleration sensor configured to measure acceleration of the physical object or the surface element in at least one direction, and a processing unit configured to receive, from the at least one sensor, signals indicating force applied on the surface element, to receive, from the at least one acceleration sensor, signals indicating acceleration, to filter out a disturbing force, determined based on acceleration signals and an effective mass of the surface element, from the signals indicating the force applied on the surface element, and to determine, based on the filtered signals, at least one point of application of force on the surface element.

According to a sixth aspect of the invention, there is provided a processing device for determining at least one point of application of force on a surface element. The processing device is configured to receive, from the at least one sensor, signals indicating force applied on the surface element, to receive, from at least one acceleration sensor, signals indicating acceleration, filter out a disturbing force, determined based on acceleration signals and an effective mass of the surface element, from the signals indicating the force applied on the surface element, and determine, based on the filtered signals, at least one point of application of force on the surface element.

The present invention has several advantages over the prior-art solutions. Thanks to the invention the mass of the surface element does not affect to the determination process of point of application of touch. Instead, a disturbing force determined based on acceleration signals and the effective mass of the surface element, is filtered out from the signals indicating force applied on the surface element before determining the point of application of touch.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
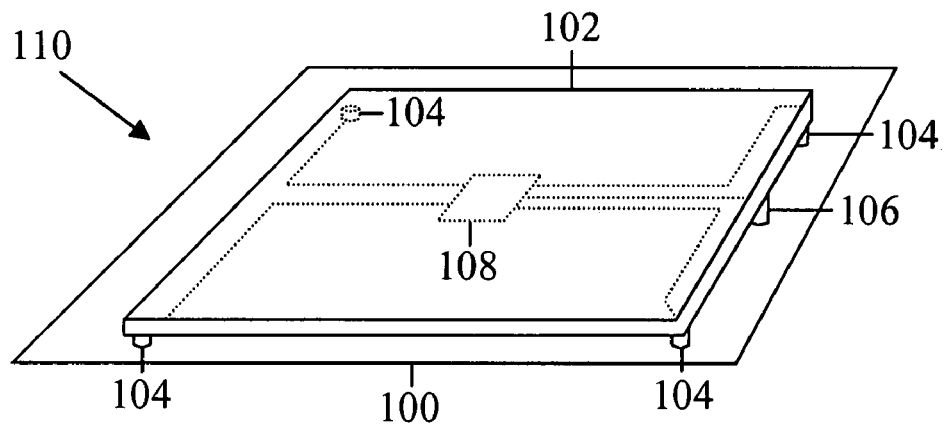
FIG. 1 illustrates one embodiment of a system according to the invention.

FIG. 1 illustrates one embodiment of a system according to the invention. It must be noted that FIG. 1 illustrates only parts of the system that are essential to describe the invention. In FIG. 1, system elements have been arranged into a single physical object, e.g. into a device. The physical object itself may be portable, stationary, small or large.

FIG. 1 discloses an embodiment in which the system disclosed in the invention has been arranged into a hand-held device. The device 110 comprises a touch panel 102. The touch panel 102 is e.g. a trans-parent lens of the hand-held device, e.g. a Personal Digital Assistant (PDA) or a mobile phone. In other words, the transparent lens may be a part of the cover of an actual display of the device 110. The touch panel 102 itself may be planar (like a plate) or a panel that is specially designed for the device in question (e.g. non-planar). The touch panel 102 is in contact with force sensors 104. In this embodiment, the force sensors 104 are incorporated into a circuit board 100 of the device 110. In other embodiments, the force sensors 104 may be separate components that have a connection to the circuit board 100 and could be integrated inside the cover structure of the device 110. Although FIG. 1 discloses that there are four separate force sensors, in another embodiment of the invention, the number of force sensors may vary, the number being anything between 1 . . . n.

The arrangement comprises also an acceleration sensor 106. In this embodiment the acceleration sensor 106 is a separate sensor connected to the touch panel 102. In other embodiments of the invention, the acceleration sensor 106 may be placed elsewhere. For example, it may be incorporated into the circuit board 110. The acceleration sensor 106 measures acceleration in at least one direction. In the present embodiment, the device 110 comprises only one acceleration sensor. In other embodiments of the invention, the device 110 may comprise more than one acceleration sensor. Each of the sensors (acceleration and force sensors) is connected to a processing unit 108, e.g. to a processor. The acceleration sensor 106 itself may be any type of sensor that is able to measure acceleration.

When the device 110 is kept e.g. in hand and the hand moves, the movement itself produces signals that are not a result of a touch on the lens. If the lens is touched (e.g. with a finger or a stylus on at least one point) at the same time as the hand moves, the signals from force sensors 104 comprise two separate signal components: a signal component produced by the touch and a signal component produced by the hand movement. If a hand holding the device 110 sways back and forth with an acceleration of 0.5 G, a 10-gram lens causes a total amount of force of 5 gram into the force sensors. Therefore, the swaying induces a clear distortion into the measurements of the force sensors.

The invention provides a solution that enables to filter out the distortion from the measurements of the force sensors. As stated above, an acceleration sensor 106 is attached to some appropriate place in the device. The sensor itself is e.g. a commercial MEMS (Micro Electro-Mechanical Systems) sensor or any other appropriate type of sensor. The acceleration sensor 106 measures acceleration in at least one dimension. The sensor itself maybe a three-axis sensor but only one axis measurement is used in practice. In other embodiments of the invention, it is possible to use two or three-axis measurements. In this embodiment, the most important direction is the direction of touch. The direction of touch is typically the direction that is perpendicular to the plane of the touch panel 102.

Figure 2:
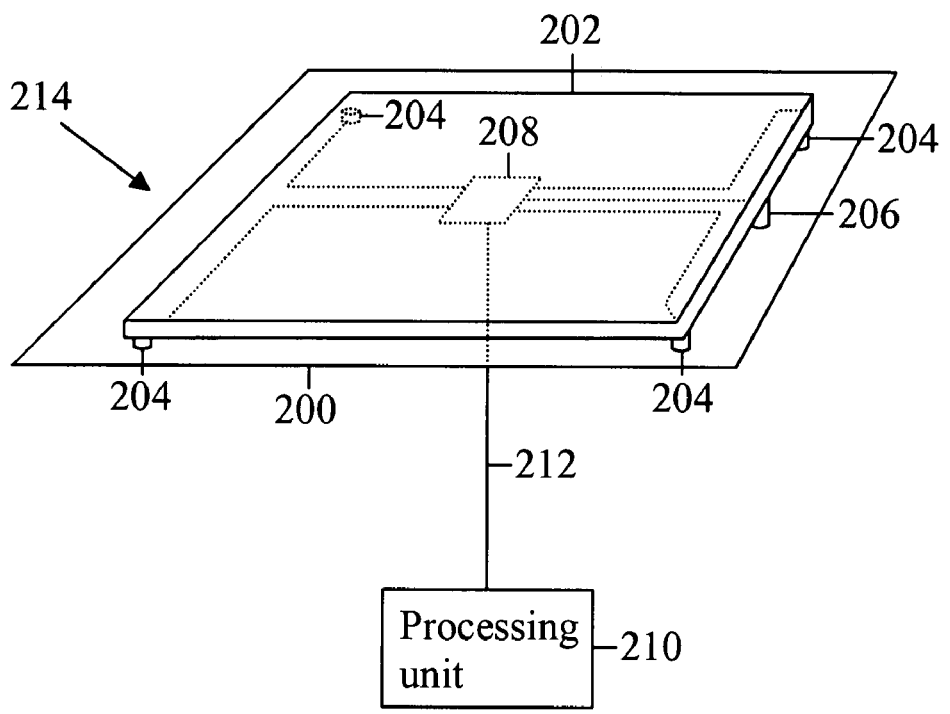
FIG. 2 illustrates another embodiment of a system according to the invention.

FIG. 2 illustrates another embodiment of a system according to the invention. It must be noted that FIG. 2 illustrates only parts of the system that are essential to describe the invention. In FIG. 2, system elements have been arranged into different physical objects. The first physical object may be in a first location and the second physical object in a second location.

A practical example of the arrangement of FIG. 2 is e.g. a car. The physical object or device 214 is e.g. an on-board computer of the car. The onboard computer 214 is arranged into an instrument board of the car. The on-board computer comprises a touch-sensitive panel 202. The driver operates the onboard computer 214 by touching appropriate points of the touch-sensitive panel 202. As in the embodiment of FIG. 1, the touch-sensitive panel 202 covers an actual display of the on-board computer 214. Reference number 200 refers to a structure that supports the touch-sensitive panel 202. In this embodiment, a plurality of force sensors 204 have been arranged between the touch-sensitive panel 202 and the supporting structure 200. The force sensors 204 are configured to measure touch on the touch-sensitive panel 202 in a single point or several point at the same time. Although FIG. 2 discloses that there are four separate force sensors, in another embodiment of the invention, the number of force sensors may vary, the number being anything between 1 . . . n.

The arrangement comprises also an acceleration sensor 206. In this embodiment the acceleration sensor 206 is a separate sensor connected to the touch-sensitive panel 202. In response to a touch, the sensors 204 and 206 transmit signals to a processing unit 210 via a connection 212. The connection 212 may be a wire connection or a wireless connection. Reference number 208 refers to an element that collects separate signals from the sensors 204, 206 and transmits the signals to the processing unit 210 via the connection 212. In this embodiment, the processing unit 210 is not a dedicated processing unit of the onboard computer 214 but a common processing unit 210 used by several elements and components in the car. Vibrations and sudden accelerations or decelerations of the car may cause disturbance signals into the force sensors 204. By taking into account signals from the acceleration sensor 206, the processing unit 210 is able to filter out a disturbing force, determined based on acceleration signals and the effective mass of the touch-sensitive panel 202, from the signals indicating the force applied on the touch-sensitive panel 202.

The actual functionality of the embodiment disclosed in FIG. 2 in the same as in the embodiment of FIG. 1. Therefore, as regards to the functionality, reference is made to the description of FIG. 1.

Furthermore, the term 'physical object' may refer to any physical entity, which contains the surface element disclosed in the invention. A sensing area (i.e. the surface element) of the physical object may contain solid, liquid or a combination of solid and liquid materials. The invention itself may be implemented in several different applications, e.g. as a part of a steering wheel, a mobile phone, a laptop, a mouse, a switch, a watch, a display, a cover structure, a control machine, a control table, a measuring device, a wooden table, a building, an elevator, etc.

It should be understood that the embodiments disclosed in FIGS. 1 and 2 are only exemplary. The invention may be applied in any application comprising a touch-sensitive operation interface that suffers from disturbance signals caused by external factors, e.g. from movement.

Figure 3:
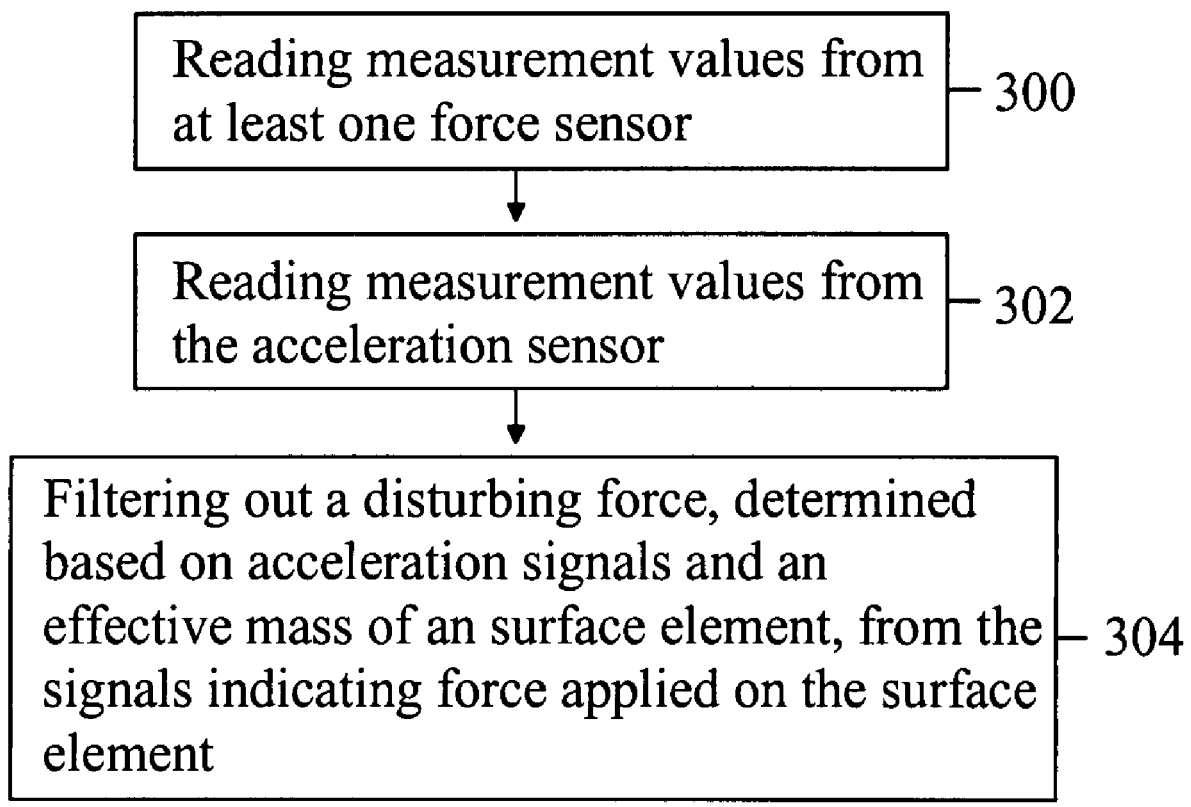
FIG. 3 illustrates one embodiment of a method according to the invention.

Referring now to FIG. 3, the processing unit 108 is configured to receive measurement signals from the force sensors 104 and from the acceleration sensor 106 (step 300). The force values may be provided to the processing unit 108 directly in a digital form. If they are still represented as analog voltage values, an analog-to-digital conversion may be made with an analog-to-digital converter in order to get digital values.

Essentially at the same time as receiving the force values, the processing unit 108 reads an acceleration value from the acceleration sensor 106 (step 302). The processing unit 108 filters out a disturbing force, calculated based on the value acceleration signals and the effective mass of the surface 102, from the signals indicating the force applied on the surface 102 (step 304). The disturbing force may develop when a user does not touch the touch panel 102 and the device 110 moves (the user e.g. holds the device in his hand). The effective mass of the touch panel 102 creates a factor into the signals transmitted to the processing unit 108.

The term 'effective mass' may have alternative meanings. For example, the effective mass may simply be the mass of the touch panel 102. In another embodiment, the effective mass is greater than the mass of the touch panel 102 since the touch panel 102 is somehow connected to the remaining part of the housing of the device. The value of the effective mass is stored in an internal memory of the processing unit 108 or alternatively the processing unit 108 has an access to a memory that holds the value information. Based on the effective mass of the touch panel 102 and an acceleration value from the acceleration sensor 106, the processing unit 108 is able to calculate the amount of force induced to each force sensor 104 as a result of inertia of the touch panel 102.

The calculated disturbing force is subtracted from the values received from the force sensors 104. In one embodiment of the invention, if the result of subtraction is less than a predetermined value (e.g. essentially equals with zero), the processing unit 108 determines that the signals from the sensors 104 were not a result of application of force on the touch panel 102. And further, in one embodiment of the invention, the processing unit 108 determines the point of application of force on the touch panel 102 based on the rectified signal values of the sensors 104, when the result of subtraction is greater than the predetermined value.

The device disclosed in FIG. 1 may comprise one or more memories or memory areas that may include e.g. random access memories (RAM), read-only memories (ROM) etc. In one embodiment of the invention, the memory includes a computer program (or portion thereof), which when executed on the processing unit performs at least some of the steps disclosed in the invention. The memory may also include other applications or software components that are not described in more detail and also may include the computer program (or portion thereof), which when executed on the processing unit performs at least some of the steps disclosed in the invention. The processing unit may also include memory or a memory may be associated therewith which may include the computer program (or portion thereof) which when executed on the processing unit performs at least some of the steps disclosed in the invention.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A system for determining at least one point of application of force on a surface element, wherein the system further comprises:
    a surface element having a mass;
    a supporting structure;
    sensors configured to measure force applied on the surface element, the sensors being arranged between the surface element and the supporting structure;
    at least one acceleration sensor configured to measure acceleration in at least one direction;
    a processing unit configured to receive, from the sensors, signals indicating force applied on the surface element, to receive, from the at least one acceleration sensor, signals indicating acceleration, to filter out a disturbing force in at least one direction, calculated from acceleration signals and the mass of the surface element from the signals indicating the force applied on the surface element, and to calculate from the filtered signals, at least one point of application of force on the surface element by subtracting the disturbing force from the force(s) determined based on signals from the sensors; and determining, whether the result of the subtraction is less than a predetermined value; and determining that the signals from the sensors were not a result of application of force on the surface element, when the result of the subtraction is less than the predetermined value; or
    calculating at least one point of application of force on the surface element based on the corrected force values, when the result of the subtraction is greater than the predetermined value.

2. The system according to claim 1, wherein the system is arranged into a single device.

3. The system according to claim 1, wherein the system is a distributed system.

4. A method for determining at least one point of application of force on a surface element, wherein the method comprises:
    receiving, from sensors, signals indicating force applied on the surface element, the sensors being arranged between the surface element and a supporting structure;
    receiving, from at least one acceleration sensor, signals indicating acceleration in at least one direction; and
    filtering out a disturbing force in at least one direction from, determined acceleration signals and a mass of the surface element, from the signals indicating the force applied on the surface element and
    determining, from the filtered signals, at least one point of application of force on the surface element by subtracting the disturbing force from the force(s) determined based on signals from the sensors; and
    determining, whether the result of the subtraction is less than a predetermined value and
    determining that the signals from the sensors were not a result of application of force on the surface element, when the result of the subtraction is less than the predetermined value; or
    calculating at least one point of application of force on the surface element based on the corrected force values, when the result of the subtraction is greater than the predetermined value.

5. A computer program embodied on a non-transitory computer readable medium for determining at least one point of application of force on a surface element, wherein the computer program comprises code adapted to perform the following steps when executed on a data-processing device:
    receiving, from at least one sensor, signals indicating force applied on the surface element, the sensors being arranged between the surface element and a supporting structure;
    receiving, from at least one acceleration sensor, signals indicating acceleration in at least one direction; and
    filtering out a disturbing force in at least one direction, determined based on acceleration signals and a mass of the surface element, from the signals indicating the force applied on the surface element, and
    determining, based on the filtered signals, at least one point of application of force on the surface element.

6. The computer program according to claim 5, wherein the computer program comprises code adapted to perform the following steps when executed on a data-processing device:
    subtracting the disturbing force from the force determined based on signals from the at least one sensor.

7. The computer program according to claim 6, wherein the computer program comprises code adapted to perform the following steps when executed on a data-processing device:
    determining, whether the result of the subtraction is less than a predetermined value; and
    determining that the signals from the at least one sensor were not a result of application of force on the surface element, when the result of the subtraction is less than the predetermined value; or
    determining the at least one point of application of force on the surface element based on the corrected signal values of the at least one sensor, when the result of the subtraction is greater than the predetermined value.

* * * * *